May 6, 1941.  S. SCHNELL  2,240,521
MASTER CYLINDER VALVE
Filed Dec. 16, 1939
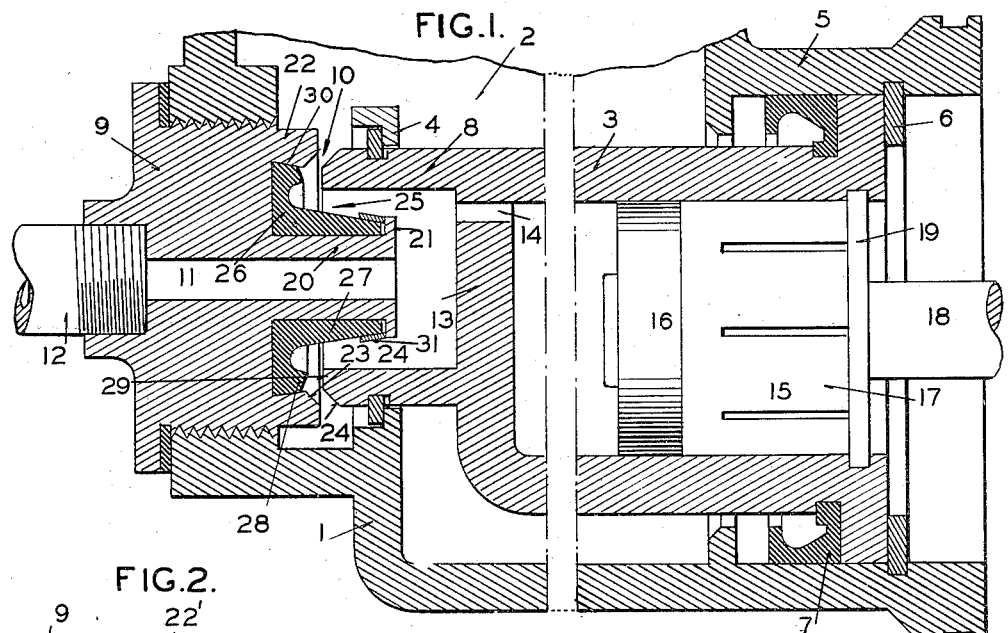
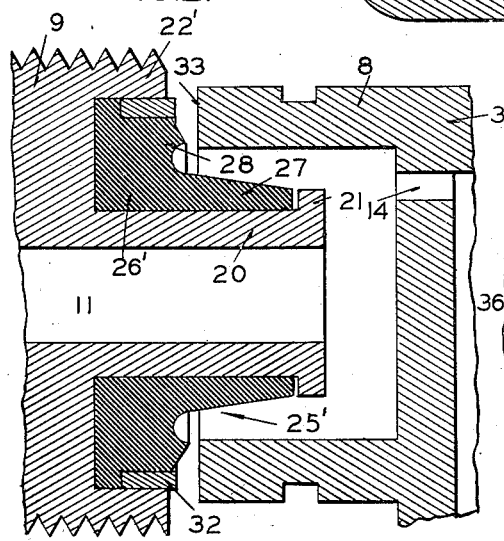
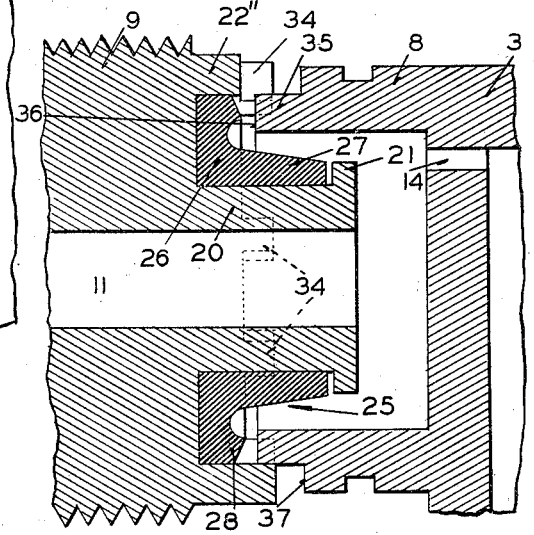
INVENTOR
STEVE SCHNELL
BY S. S. Huffman
ATTORNEY Patented May 6, 1941

2,240,521

UNITED STATES PATENT OFFICE 2,240,521

MASTER CYLINDER VALVE

Steve Schnell, Overland, Mo., assignor to Wagner Electric Corporation, St. Louis, Mo., a corporation of Delaware Application December 16, 1939, Serial No. 309,572

10 Claims. (Cl. 251—27)

My invention relates to valve mechanism and more particularly to an improved valve construction for use in a master cylinder device for developing fluid pressure such as, for example, the master cylinder device shown by my co-pending application Serial No. 274,540, filed May 19, 1939.

One of the objects of my invention is to provide an improved valve mechanism of the type in which the cooperating elements, comprising a yieldable sealing member and an engageable non-resilient member, are so associated with each other that the valve will be capable of efficiently confining high fluid pressures.

Another object of my invention is to so construct a valve mechanism embodying a yieldable sealing member that said member will not be cut or damaged by a movable non-resilient member.

Still a further object of my invention is to produce an improved yieldable sealing member for a valve.

Other objects of my invention will become apparent from the following description taken in connection with the accompanying drawing in which Figure 1 is a cross-sectional view of a portion of a master cylinder device having incorporated therein a valve structure embodying my invention; Figure 2 is a cross-sectional view of a modified construction; and Figure 3 is a cross-sectional view of another modified construction.

Referring to Figure 1, the particular master cylinder device in which my improved valve structure is incorporated comprises a casing 1 fixed to a convenient support and forming a reservoir 2 for fluid. Within the casing is a cylinder member 3 mounted at its front end in a guide 4 and at its rear end in a cylindrical extension 5 for reciprocable movement. A stop 6 limits the rearward movement and a packing cup 7 seals the cylinder and reservoir. As shown, the forward portion of the cylinder member 3 which is mounted in the guide is in the form of a cylindrical extension 8 of reduced internal diameter and the end surface thereof cooperates with a plug 9 to form a valve 10 to control communication between the reservoir 2 and the cylinder member. The plug has an outlet passage 11 which is connected by a conduit 12 to a fluid motor for actuating by any desired device, as for example, a vehicle brake.

The cylinder member at the extension 8 is provided with a partition 13 having a passage 14 for permitting communication between the interior of the extension and the main portion of the cylinder member. Within the cylinder is a piston 15 having mounted on its end a sealing cup 16. The skirt of the piston is split to form resilient portions 17 which provide friction between the cylinder and the piston. The piston is actuated by a piston rod 18 and a cooperating spring (not shown) normally biases the piston to its retracted position as shown wherein it abuts a stop 19 on the cylinder and also positions the cylinder against its stop 6.

When the piston rod 18 is initially moved, the friction between the cup and the cylinder wall and the friction between the skirt of the piston and cylinder wall will cause the cylinder member to move with the piston and to a position to close valve 10. This will cut off communication between the reservoir and the interior of the extension 8. Continued movement of the piston rod will now cause the piston to move relatively to the cylinder member and thereby place the fluid in the cylinder under pressure and force it out the outlet 11 to actuate the fluid motor connected to the conduit 12. The valve member 10 is maintained in closed position by the frictional drag between the cup and piston and the cylinder and also by the differential force between the forces acting on the partition due to the difference in areas acted upon by the fluid pressure in the main portion of the cylinder member and in the extension 8. This differential force increases with increasing fluid pressure caused by forward movement of the piston in the cylinder member 3.

When the piston is retracted, the pressure in the cylinder member will drop and the friction between both the piston and piston cup and the cylinder wall will move the cylinder member rearward and open valve 10, thereby releasing the fluid under pressure acting on the fluid motor. The parts assume the positions shown in Figure 1 when the piston is fully retracted. When valve 10 is open, expansion and contraction of the fluid is permitted. Also, if during rapid retractile movement of the piston sub-atmospheric pressure is created in the cylinder, fluid from the reservoir will readily flow into the cylinder through the open valve.

In the type of master cylinder device just described, it is necessary to have the valve 10 so constructed that it will hold high pressures, will not be cut by the end of the extension 8 and the plug, and will not be damaged by the release of the fluid under high pressure when the valve is initially opened.

In accordance with my invention the plug 9 is provided with an extension 20 through which extends the outlet 11 and this extension at its inner end has a flange 21. The plug is also provided with an axial extending annular flange 22 in spaced surrounding relation to the extension 20 and the outer end thereof has a beveled surface 23 which is adapted to cooperate with a beveled surface 24 on the end of the extension 8 of the cylinder member 3. A sealing member 25 made of rubber or like material is mounted upon the extension 20 and cooperates with the end of the extension 8 to insure that the valve 10 will be fluid tight when closed by movement of the valve member 3. This sealing member has an annular body portion 26 which engages the face of the plug between the extension 20 and flange 22 and an axially extending annular lip 27 which engages the surface of the extension 20 and extends to a point adjacent its end flange 21. The body portion of the sealing member is formed with an annular rib 28 having a relatively sharp forward edge which is so positioned as to be initially engaged by the flat end surface 29 on the extension 8 of the cylinder member 3 when it is moved to close the valve. To assist in holding the sealing member in position the flange 22 may be under cut as shown at 30 and the outer surface of the body portion is formed to a fit. If it is desired a retaining ring 31 may be mounted on the outer end of the lip 27 and held in position by flange 21.

With the valve mechanism incorporated in the master cylinder device in the manner described fluid under pressure will be effectively sealed when it is closed and the valve will be capable of a long efficient life. When the cylinder member 3 moves forwardly the surface 29 will engage the rib 28 and compress it until the beveled surfaces 23 and 24 engage. Since the edge of the sealing member lies slightly back of the bevel surface 23 there is no danger of it being pushed into the space between the beveled surfaces as they approach each other. This will now confine the sealing member. The fluid pressure in the extension 8 which acts thereon will force the lip 27 tightly against the surface of the extension 20 and the body portion 26 against the surface of the plug and the flange 22 thereby preventing fluid under pressure from creeping around the sealing member. Also the fluid pressure acting on the surface of the sealing member between the ridge 28 and the lip 27 will compress this portion of the sealing member and cause the ridge to engage the surface 29 with additional pressure.

When the cylinder member 3 is retracted and the valve opened the ridge will become disengaged from the surface 29 and during this disengagement there is no danger of the rib being forced between the beveled surfaces because of its V-shape cross section. Also no fluid can get behind the body portion of the cup and force it in between the beveled surfaces. Thus a subsequent closing of the valve will therefore not cut the sealing member. In order to insure that the beveled surfaces will have full contact at all points the extension 8 has slight play in the guide 4 as shown.

Referring to the modified structure shown in Figure 2, a similar valve construction is shown which does not require the cooperating beveled surfaces on the plug and the cylindrical extension 8. The plug 9 is the same as the one described except that the flange 22' is not provided with a beveled surface. The sealing member 25' is mounted on the extension 20 and has a fairly thick body portion 26'. Surrounding a part of the body portion of reduced diameter is a ring 32. This ring projects slightly beyond the edge of the flange 22' and is adapted to be engaged by the flat end surface 33 on the end of the extension 8 of the reciprocable cylinder member 3. The ridge 28 on the body of the sealing member projects beyond the ring as shown for engagement with the surface 33 prior to its contact with the ring.

When the cylinder member 3 is moved forward the surface 33 will first engage the relatively sharp edge of the ridge 28 and begin to compress it. Next the surface 33 will engage the ring 32 and press it into the portion of the body of the sealing member at its back. The movement of the cylinder member 3 is stopped when it engages the end of flange 22' and under these conditions the sealing member is so confined that there is no possibility of high fluid pressure forcing it into any cracks where it can be cut or become damaged. The fluid pressure acting on the yieldable material of the sealing member will also compress it and cause it to have pressure engagement with the surfaces it contacts. The compressed portion back of the ring 32 will maintain the ring against the surface 33 at all points. When the cylinder member 3 is retracted the V-shape cross section of the ridge will insure that high fluid pressures being released will not force any portion of the sealing member into the space between the ring and surface 33.

In the modified construction shown in Figure 3 the sealing member 25 is the same as shown in Figure 1. The flange 22" on the plug 9 is provided with spaced axially extending lugs 34 which serve as guides for the reduced end 35 on the extension 8 which is of such diameter to be snugly received in the flange 22".

When the valve is open as shown fluid is free to flow between the lugs 34. When the cylinder member is moved forwardly the flat end surface 36 on the extension 8 engages the ridge 28 and begins to compress it and the body of the sealing member. Next the reduced end passes the end of the flange 22" and thus confines the sealing member. The forward movement of the cylinder member 3 is stopped by engagement of the lugs 34 with the shoulder 37 formed by the reduced end 35.

Being aware of the possibility of other modifications in the particular structures herein described without departing from the fundamental principles of my invention, I do not intend that its scope be limited except as set forth by the appended claims.

Having fully described my invention, what I claim as new and desire to secure by Letters Patent of the United States is:

1. In a fluid pressure producing apparatus, a fixed member provided with a passage and an annular recess around said passage, an annular movable member, and an annular sealing member positioned in said recess and provided with a rib for engagement with the end surface of the movable member when it is moved toward the fixed member, said fixed member and movable member having associated therewith cooperating means which become operative after the movable member has engaged and compressed the yieldable member to thereby confine the yieldable member in the recess and prevent fluid pressure in the annular movable member from causing any portion of the yieldable member to be forced out of the recess.

2. In a fluid pressure apparatus provided with a member having an outlet and an annular recess in concentric relation to the outlet, an annular member, said members having relative movement, an annular yieldable sealing member positioned in the recess and having an annular rib adapted to be engaged and compressed by the end of the annular member when the members are moved relatively toward each other, and means comprising cooperating surfaces for confining the sealing member and preventing it from being forced outwardly beyond its periphery by fluid pressure acting thereon, said surfaces being moved into cooperating relation after the annular member has engaged and compressed the rib.

3. In a fluid pressure apparatus, a fixed member, an annular movable member, said fixed member being provided with an annular recess, an annular yieldable sealing member positioned in said recess and having an annular rib of general V-shaped cross section which is adapted to be engageable by a flat surface on the movable member when moved toward the fixed member, said yieldable member also being provided with a portion forming an annular lip engaging the inner annular surface of the recess and being exposed to fluid at all times, and means providing surfaces on the movable member and the fixed member which are capable of being brought into cooperative relationship after the surface on the movable member engages the rib and thus confine the sealing member in the recess.

4. In fluid pressure apparatus provided with a fixed member having an outlet and a recess surrounding the outlet, and annular movable member, a yieldable sealing member positioned in the recess and having an annular rib projecting outward beyond the outer wall of the recess, and a rigid ring imbedded in the forward portion of the periphery of the sealing member and projecting outwardly beyond the outer wall of the recess but lying back of the edge of the rib whereby the end of the annular member when moved toward the fixed member will first engage and compress the rib of the sealing member and then engage the ring and compress the portion of the sealing member which lies in back thereof.

5. In fluid pressure apparatus provided with a fixed member having an outlet and a recess surrounding the outlet, an annular movable member having a flat end surface, a yieldable sealing member positioned in the recess and having an inner sealing lip engaging the inner wall of the recess and a concentric annular rib projecting outward beyond the outer wall of the recess, and a rigid ring imbedded in the forward portion of the periphery of the sealing member and projecting outwardly beyond the outer wall of the recess but lying back of the edge of the rib whereby the flat end surface of the annular member when moved toward the fixed member for engagement therewith will first engage and compress the rib of the sealing member and then engage the ring and compress the portion of the sealing member which lies in back thereof.

6. A valve seat of yieldable material for a fluid pressure apparatus comprising an annular body portion provided with an axially extending annular tapered flange forming a lip which is adapted to be exposed to fluid pressure on its outer surface and an annular rib in spaced surrounding relation to the flange and of general V-shaped cross section.

7. A valve seat of yieldable material for a fluid pressure apparatus comprising an annular body portion having a flat end surface, an axially extending annular tapered flange projecting from the inner part of the body portion and on the end opposite the flat end surface and adapted to be exposed to fluid pressure on its outer surface, and an annular rib also on the same end as the flange and in spaced surrounding relation to said flange, said rib being of a general V-shaped cross section and of less axial length than the flange.

8. In fluid pressure apparatus, a fixed member having a cylindrical extension forming an outlet passage and a recess surrounding the extension, an annular movable member in spaced surrounding relation to the extension, an annular yieldable sealing member positioned in the recess and having an inner axial flange exposed to fluid pressure and engaging the cylindrical extension, said sealing member also being provided with an outer annular rib surrounding the flange and adapted to be engaged and compressed by the movable member when moved toward the fixed member, and means on the portion of the fixed member surrounding the sealing member and on the annular movable member capable of cooperation with each other to confine the rib and prevent it from being forced outwardly by fluid pressure acting on the sealing member when the annular member is moved toward the fixed member, said cooperating means assuming the confining relationship after the movable member has engaged and compressed the rib.

9. In fluid pressure apparatus, a fixed member having a cylindrical extension forming an outlet passage, a recess surrounding the extension and an annular beveled surface adjacent the recess, an annular movable member in spaced surrounding relation to the extension and provided with a flat end surface and an annular beveled surface, an annular yieldable sealing member positioned in the recess and having an inner axial flange exposed to fluid pressure and engaging the cylindrical extension, said sealing member also being provided with an annular rib surrounding the flange and engageable by the flat end surface of the movable member when it is moved toward the fixed member, said beveled surfaces on the fixed and movable members being capable of cooperating engagement to confine the rib and prevent it from being forced outwardly by fluid pressure acting on the sealing member after the flat end surface has engaged the rib.

10. In fluid pressure apparatus, a fixed member having a cylindrical extension forming an outlet passage, a recess surrounding the extension and an annular beveled surface adjacent the recess, an annular movable member in spaced surrounding relation to the extension and provided with a flat end surface, said annular member being of a size to snugly telescope within the outer wall of the recess, an annular yieldable sealing member positioned in the recess and having an inner axial flange exposed to fluid pressure and engaging the cylindrical extension and also an annular rib surrounding the flange for engagement by the flat end surface of the movable member when it is moved toward the fixed member, said rib being so related to the outer wall of the recess that the end of the annular movable member will engage and compress it prior to said movable member assuming its telescoping relation with the outer wall of the recess to thereby confine the sealing member.

STEVE SCHNELL.